April 1, 1941.                    W. C. BROEKHUYSEN                    2,237,254
                   METHOD AND APPARATUS FOR DETECTING METAL
                        PARTICLES IN NONMETALLIC MATERIAL
                              Filed Jan. 16, 1937              2 Sheets-Sheet 1
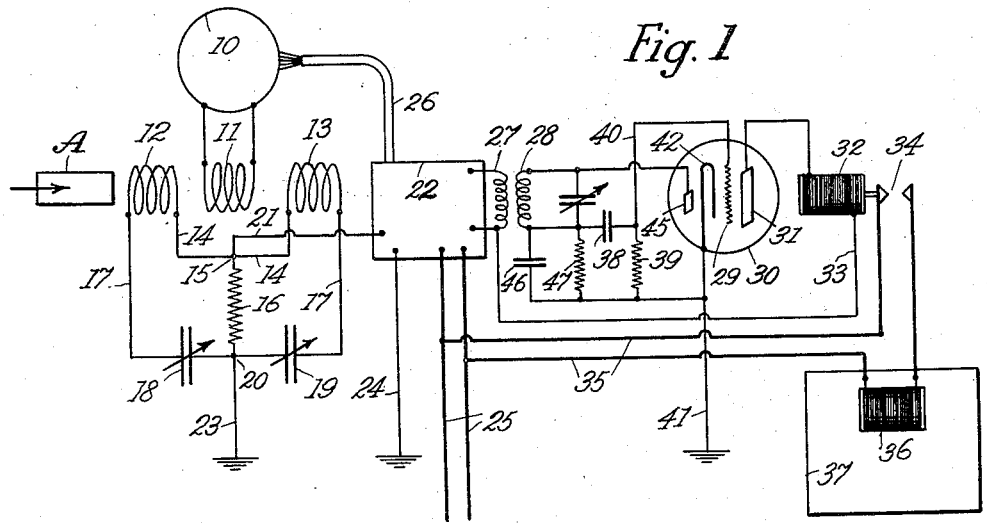
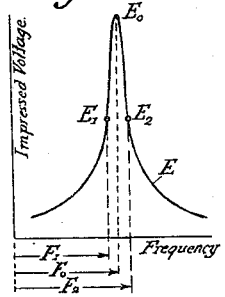
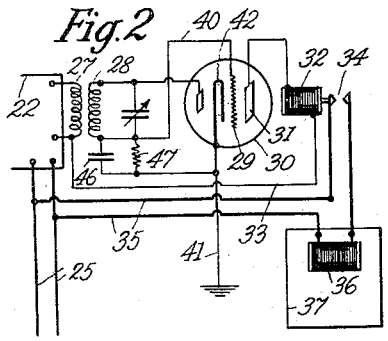
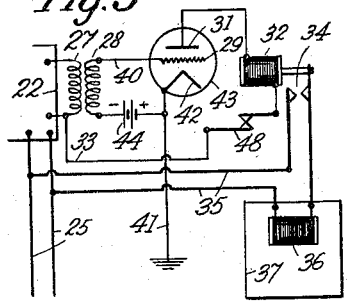
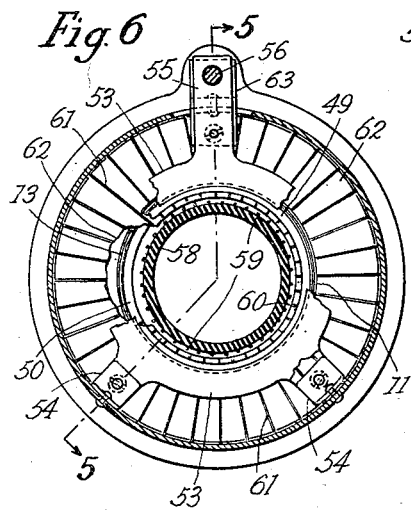
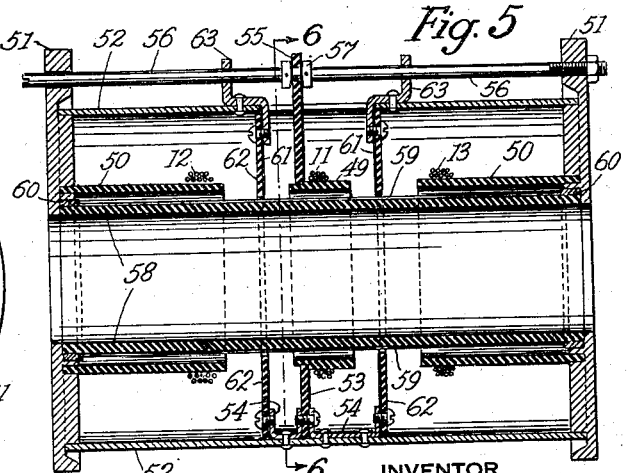
INVENTOR
*William C. Broekhuysen*
BY
*E. C. Sanborn*
ATTORNEY April 1, 1941.     W. C. BROEKHUYSEN     2,237,254
METHOD AND APPARATUS FOR DETECTING METAL
PARTICLES IN NONMETALLIC MATERIAL
Filed Jan. 16, 1937     2 Sheets-Sheet 2
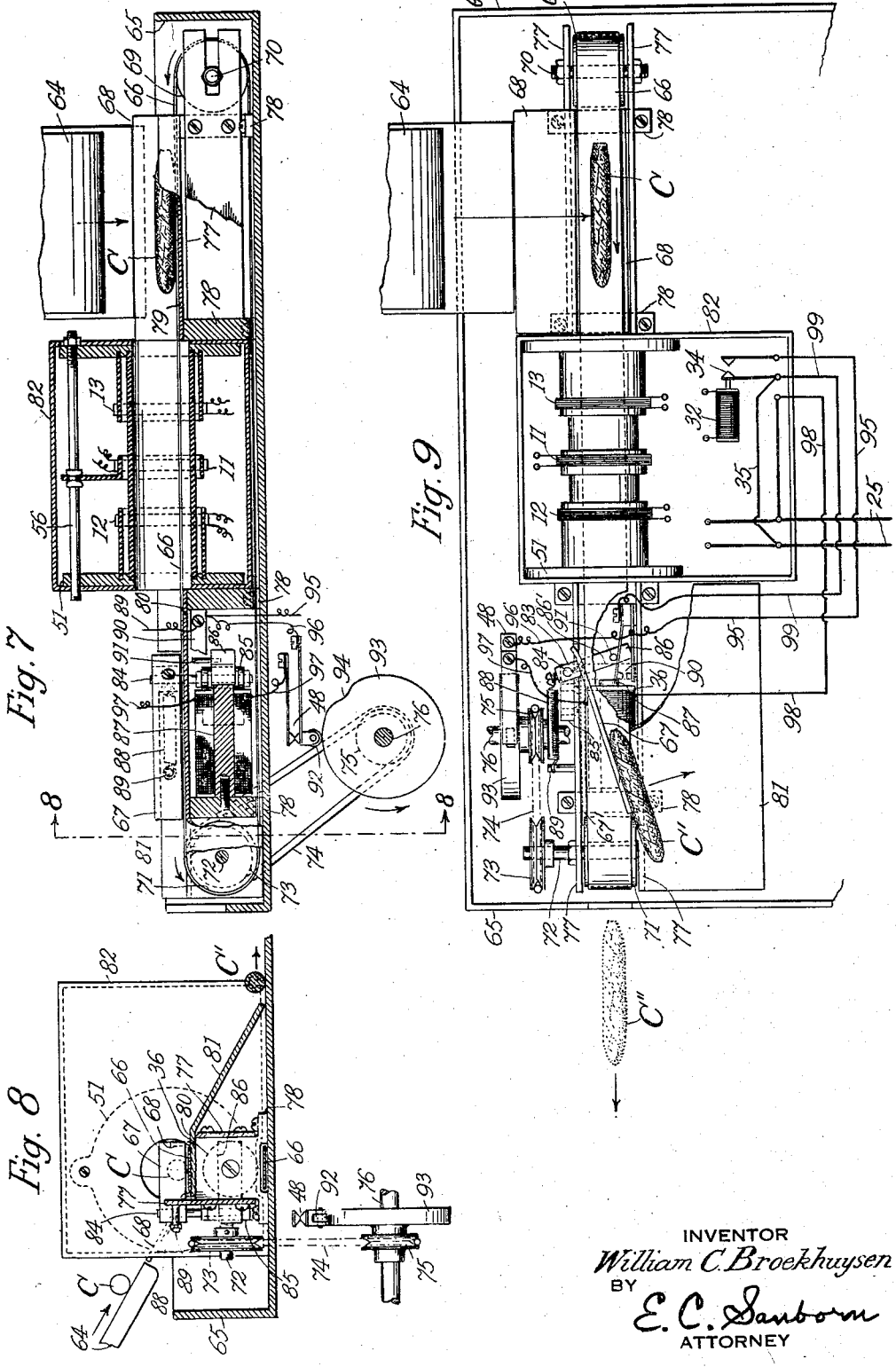
INVENTOR
William C. Broekhuysen
BY
E. C. Sanborn
ATTORNEY Patented Apr. 1, 1941

2,237,254

UNITED STATES PATENT OFFICE 2,237,254

METHOD AND APPARATUS FOR DETECTING METAL PARTICLES IN NONMETALLIC MATERIAL

William C. Broekhuysen, Brooklyn, N. Y., assignor to International Cigar Machinery Company, a corporation of New Jersey Application January 16, 1937, Serial No. 120,903

12 Claims. (Cl. 209—81)

This invention relates to a method and apparatus for detecting foreign metal particles in nonmetallic materials such as foodstuffs, tobacco, cigars, etc., in which the presence of such particles would be detrimental to their use; and an object is to provide a simple and practical device which can be readily incorporated in machine for packaging or otherwise preparing such materials for marketing.

In carrying out the invention I have illustrated a highly sensitive method for detecting the presence of metal particles in nonconducting material, in which the material is passed through the electromagnetic field of a coil connected in an alternating current impedance bridge circuit with another identical but oppositely wound coil, both energized by a third coil in such a manner that the two first-named coils are normally in exact electrical balance with one another. When metal is present in the material introduced into one of the two identical detector coils, this will affect the inductance of this coil and will disturb the balance, thereby establishing a voltage across the normally neutral diagonal of the bridge circuit. This voltage can be amplified by well-known means so as to actuate a relay for giving a signal or for operating a suitable device for marking or ejecting the defective material.

The foregoing method is especially advantageous in that nonmagnetic, as well as magnetic, metallic particles can be detected.

The unbalance voltage, after amplification, is rectified (or detected), and the amplified voltage is coupled to the grid of an output tube which, in turn, actuates the relay. According to the arrangement of this coupling, the relay may be caused to operate either when the actual magnitude of the unbalance voltage across the bridge exceeds a given minimum value, or when the voltage changes at a rate exceeding a predetermined minimum value. The latter arrangement is preferable if the change of voltage to be detected is fairly rapid as, in that case, the amplifier can be made so as not to react to slow changes caused by variations in temperature, humidity, etc.

While the detection of foreign metal objects, for obvious reasons, is most important in foodstuffs, in the following description special reference is had to the application of this device to the detection of metallic particles in cigars and to the ejection of such defective cigars from the cigar machine before they reach the attendant for final handling.

Other objects and advantages of my invention will be apparent from the ensuing description and claims.

In the accompanying drawings which form a part of this specification:

Fig. 1 is a diagram showing the principle of the new metal detector.

Figs. 2 and 3 are diagrams showing modifications in the coupling of the amplified voltage to the grid of the output tube.

Fig. 4 is a graph of the electromotive force impressed on the detector coils by an oscillator of given frequency, at different tuned frequencies of the coils.

Fig. 5 is a sectional side elevation showing the mechanical arrangement of the detector unit consisting of an energizing coil and two detector coils.

Fig. 6 is a sectional end elevation on line 6—6 of Fig. 5.

Fig. 7 is a partial side elevation of a cigar machine showing the application of the new metal detector for ejecting defective cigars before inspecting and bunching the finished cigars.

Fig. 8 is an end elevation on line 8—8 of Fig. 7, and

Fig. 9 is a plan view of the mechanisms shown in Fig. 7, with a diagram of their electrical connections.

Referring to Fig. 1, the current from a vacuum tube oscillator 10, preferably of high frequency, energizes a coil 11 which induces equal but opposite voltages in two oppositely wound identical coils 12 and 13 placed coaxial with coil 11 at equal distances from its ends. The coils 12 and 13 are connected into an inductance bridge circuit by joining their inward ends by wires 14 to one terminal 15 of a high resistance 16 and their outward ends by wires 17 through variable condensers 18 and 19 to the other terminal 20 of resistor 16. The midpoint 15 of the two detector coils 12 and 13 is connected by a wire 21 to the input terminal of a high-frequency amplifier unit 22, while the midpoint 20 of the two condensers 18 and 19 is connected by a wire 23 to ground, the unit 22 being grounded by a wire 24. The oscillator 10 and the amplifier unit 22 are supplied with power through wires 25 which may be connected to any suitable source of alternating or direct current. The oscillator is connected to the unit 22 by a cable 26 which contains the necessary wires leading to its various elements.

By means of the condensers 18 and 19, the coils 12 and 13 can be tuned to any frequency with respect to the oscillator frequency. If the two sides of the bridge circuit are thus tuned to the same frequency and are perfectly symmetrical otherwise, the bridge circuit is in perfect electrical balance and the voltage between points 15 and 20 will be zero. Any change in the inductance of one of the coils 12 and 13 such as may be caused by the presence of a piece of metal in an article A when passed through the field of one of them, will disturb this electrical balance and a high-frequency voltage will be developed between points 15 and 20 and will be impressed by the wire 21 on the amplifier unit 22. Resistance 16 serves merely for preventing an accumulation of charges on condensers 18 and 19, which might paralyze the first tube of the amplifier unit 22.

The amplified high-frequency voltage delivered by unit 22 is impressed through the inductively coupled coils 27 and 28 on the rectifier plate 45 of the detector-output tube 30. The rectified voltage is impressed across a condenser 46 and a high resistance 47, and may be either capacitively coupled to the grid 29 of the output tube 30 through a coupling condenser 38 and a grid leak 39, as shown in Fig. 1, or it may be directly impressed on the grid, as shown in Fig. 2.

If the coupling is capacitive, as shown in Fig. 1, only a change in the rectified voltage will be impressed on the grid of the output tube, provided the rate of change exceeds a certain minimum value depending on the relative magnitudes of the coupling condenser 38 and the grid-leak resistor 39. If the high-frequency voltage across resistor 16, and consequently also the rectified voltage across condenser 46, increases faster than this rate, a negative potential will be impressed on grid 29, and the current from plate 31 to cathode 42 of tube 30, which flows also through relay coil 32 and wire 33, will be reduced to such an extent that the relay armature is released and contact 34 closes. The plate current supply is obtained from the positive side of the plate supply in amplifier 22, the negative side of which is grounded. The closing of contact 34 allows current to flow from the line 25 by wires 35 through the operating coil 36 of an electromagnetic device 37, which ejects the article A on its emergence from the detector unit, if found to contain metal. With this arrangement the relay will not react to slow voltage changes across resistor 16 caused by variation of temperature, humidity, etc.

If the rectified voltage is directly impressed by wire 40 on the grid 29 of the output tube 30, as shown in Fig. 2, the relay 32 will drop out whenever the voltage across resistor 16 exceeds a given minimum value governed by the degree of amplification obtained by the unit 22 and by the characteristics of the output tube 30. In Figures 1 and 2, the two functions of rectifier and output tube are combined in one tube 30 of the duo-diode-triode type.

As a third possibility, the amplified high-frequency voltage may be directly impressed through wire 40 on the grid 29 of a grid-controlled rectifier tube 43 of the thyratron type, as shown in Fig. 3, a battery 44 being inserted between coil 28 and ground wire 41 to produce a negative bias on grid 29. In the latter arrangement, the relay 32 will pull in whenever the bridge voltage exceeds a certain minimum value, and will be held in, even after this voltage has disappeared, until an interrupter contact 48 in series with the relay coil 32 is momentarily opened.

For best results, the coils 12 and 13 should be tuned to resonance at a frequency somewhat above or below the frequency of the oscillator 10 at a point near the peak of the frequency-voltage curve of the detector coils where the steepness of the curve is greatest and therefore a given change in resonant frequency will cause a maximum change of impressed voltage across the coils. There are two such points $E_1$ and $E_2$ on the voltage curve E, Fig. 4, corresponding to frequencies $F_1$ and $F_2$, respectively, at approximately equal distances above and below the oscillator frequency $F_0$, the impressed voltage being the same in both. In practice, these points $E_1$ and $E_2$ are found to be at approximately one-half of the peak voltage $E_0$ obtained at exact resonance with the fixed oscillator. The coils 12 and 13 must be tuned to the same frequency and not to the same resulting impressed voltage at opposite sides of the oscillator frequency $F_0$, because, in order to obtain zero voltage across resistor 16, it is necessary that the voltages across the coils 12 and 13 are not only inversely proportional to the capacities of condensers 18 and 19, but are also in direct opposition, or exactly 180 electrical degrees out of phase. The final adjustment to this end may be obtained by shifting the energizing coil 11 slightly to one side or the other as required.

For proper adjustment and adequate shielding, the three coils 11, 12, and 13 are in practice assembled in one unit. In Figs. 5 and 6, the arrangement of a detector unit for long and comparatively thin objects, such as loaves of bread, candy bars, cigars, etc. is shown. The coils 11, 12, and 13 are wound on the center section 49 and the end sections 50 cut from a tube of insulating material, the end sections 50 being fastened in annular metallic end disks 51 held together by a grounded metal cylinder 52, shielding the coils against external interference. The center section 49 is supported by an annular disk 53 of insulating material, this disk being fastened by cleats 54 to the shield can 52 and having an extension 55 protruding through an opening in can 52. The extending arm 55 is supported on a long screw 56 held in fixed position on the former by collars 57 pinned on the latter. The screw 56 is threaded into engagement with one of the end disks 51 so that, by turning the same, the position of coil 11 relative to the coils 12 and 13 can be adjusted for exact electrical balance. In order to prevent any change in the electrical balance which might be caused by the nonmetallic object itself when passing through the coils, the passage-way for testing the objects must be shielded electrostatically. For this purpose, an insulating tube 58 is mounted inside of the tubes 49 and 50, the tube 58 carrying a layer of fine copper wires 59 spaced at equal intervals parallel to its axis and connected at one or both ends to a metal ring 60 inserted into a counterbore of disk 51 and in electrical contact therewith. In order to prevent the adjustment of the inductive balance of the coils 11, 12, and 13 from affecting their electrostatic balance, the coil 11 is electrostatically shielded from coils 12 and 13 by grounded open radial wires 61 attached to one or both sides of annular disks 62 mounted in the spaces between tube sections 49 and 50 by means of the cleats 54 and of brackets 63 which latter also serve as guides for the screw 56.

Coils 12 and 13 are at equal distance on opposite sides of coil 11 and are identical in number of turns and sizes of wire, but wound in opposite directions. They are tuned to the same frequency and have equal impressed voltages which balance each other. A variation in oscillator frequency will affect both coils to the same degree and therefore will not disturb the balance of the bridge. But a particle of metal entering the field of either one of these coils will cause an unbalance of the voltage which may be made to eject the article containing the metal after emerging from the detector unit, as will be described hereinafter.

Coils 12 and 13 do not have to be mounted in the same shield can 52, but may be mounted in separate shields and the object to be examined passed through only one of them. They may be coupled to the oscillator either inductively as shown in Fig. 1, or capacitively through condensers in the well-known manner. The greatest stability is obtained, however, with a perfectly symmetrical arrangement, as shown in Figures 5 and 6. For examination of foodstuffs, such as flour, cereals, etc. in bulk, the unit shown in Figures 5 and 6 may preferably be mounted vertically or at an angle, and the bulk-material passed through tube 58 by gravity.

The application of my invention to the detection of metal in cigars and to the ejection of the defective cigars from a cigar machine is shown in Figures 7, 8, and 9. While the invention may be applied to the detection of metal in the tobacco of the cigar units at any of the various stages in the formation of the cigars by the cigar machine, as, for example, prior to the application of the wrappers, I have illustrated it as applied to the cigar units after leaving the "reroller 64." In a cigar machine, the finished cigars are delivered from the "reroller," in which they are smoothed out, knurled and trimmed to size, to an inspection table 65 from which the operator takes them for hand knurling and other finishing touches and for final stacking into the bundle-tray. In order to prevent metal-containing cigars from being thus delivered, the inspection table 65 is shown provided with an endless belt 66 which carries the cigars C through the above-described metal detector to an electromagnetic deflecting device 67 which, controlled by the detector, causes the perfect cigars C' to fall onto the table while permitting faulty cigars C'' to pass beyond the same.

From the reroller 64, the cigars C are deposited on belt 66 by a guide 68. The belt 66 runs from a pulley 69 on a shaft 70 to a pulley 71 on a shaft 72 driven through a pulley 73 by a belt 74 from a pulley 75 on a drive shaft 76 of the cigar machine. The shafts 70 and 72 are carried by side plates 77 attached to blocks 78 fastened to table 65, the belt 66 being supported by plates 79 and 80 carried by blocks 78. The supporting plate 80 at the delivery end of belt 66 has a transverse inclined extension 81 on which the cigars C', free from metal particles, roll onto table 65.

The cigar, upon emerging from the unit 82 which contains the metal-detector coils 11, 12, and 13, the oscillator 10, amplifier 22, rectifier and output tube 30, relay 32 and contact 34, encounters the deflector 67 which by a block 83 is affixed to a vertical shaft 84 supported by a bearing 85 attached to side bar 77. On shaft 84 is mounted the armature 86 of an electromagnet 87 which is energized by the coil 36 controlled by the contact 34 of the detector relay 32. The electromagnet 87 is fastened between the loops of belt 66 to block 78. The armature 86 is held by a spring 88, anchored on a post 89 in side plate 77, in the position shown in full lines in Fig. 9, in which position the deflector plate 67 is in an oblique position across the belt 66. In this position, the cigar C' is guided onto the incline 81 and rolls upon table 65. When metal is detected in the cigar, the contact 34 is closed by the relay 32, thereby the coil 36 is energized and the armature 86 is attracted into position 86', shown in dotted lines, by the electromagnet 87, thus causing the shaft 84 to turn the deflector 67 into the parallel position 67' in which the faulty cigar C'' is no longer deflected but is carried by the belt 66 beyond the edge of table 65.

Since, when the apparatus illustrated in Fig. 1 or Fig. 2 is employed, the impulse imparted by the closing of contact 34 is only momentary, a holding contact 90 actuated by a pin 91 attached to the armature 86 is provided, which keeps the electromagnet 87 energized until the circuit is automatically broken in each cycle of the machine by a release contact 48 held in closed position by a roller 92 riding on the circumference of a cam 93 on shaft 76, this cam having a depression 94 so positioned as to properly time the momentary opening of contact 90.

When the relay contact 34 closes, in the event of a faulty cigar, current from the line 25 and wire 35 passes through wires 95 and 96, which are joined at one side of contact 90, to one terminal of the normally closed release contact 48 and from its other terminal through wire 97 to the electromagnet-coil 36, returning through wire 98 to the line 25. This momentary current, through the attraction of armature 86, causes the pin 91 to close contact 90 so that, upon opening of contact 34, the current from line 25 then passes from wire 35 through wire 99 to contact 90 from which it reaches the coil 36 through wires 96, 97 and contact 48, returning from coil 36 to the line by wire 98 as before. This circuit through contact 90 remains closed until the contact 48 is opened by cam 93, whereupon the armature 86 returns to its normal position and the contact 90 reopens, thus replacing the entire detector system into starting position, ready for the next cigar arriving on the forwarding belt.

It will of course be understood that when the magnet 36 is energized from the thyratron tube illustrated in Figure 3, the holding circuit above described is unnecessary, since the relay 32 remains energized and maintains the circuit through magnet 36 closed. In this case, the contacts 48 are positioned in series with the relay coil 32, as will be apparent.

The terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

I claim:

1. Apparatus for the detection of metallic matter in nonmetallic objects, said apparatus comprising a coil having an air core, means for energizing said coil, means for conveying a series of said objects successively through said coil, and shielding means between said coil and the path of travel of said objects for preventing electrostatic interference with said coil by the passage of said objects therethrough.

2. Apparatus for the detection of metallic matter in nonmetallic objects, said apparatus comprising a coil having an air core, means for energizing said coil, means for conveying a series of said objects successively through said coil, and means comprising a plurality of wires surrounding the path of travel of said objects for preventing electrostatic interference with said coil by the passage of said objects therethrough.

3. Apparatus for the detection of metallic matter in nonmetallic objects, said apparatus comprising a pair of axially-spaced oppositely-wound coils, insulating means supporting said coils, a third coil interposed between the coils of said pair, insulating means supporting said third coil, shielding means surrounding said coils for protecting the same against external interference, means for adjusting said third coil axially with respect to the others of said coils, a tube of insulating material within said coils and providing a passage for the travel of objects therethrough, a plurality of wires surrounding said tube and shielding said coils electrostatically from said objects, a plurality of insulating members interposed between said third coil and the others of said coils, each of said insulating members carrying radially extending wires for shielding said other coils electrostatically from said third coil.

4. Apparatus for the detection of metallic matter in nonmetallic objects, said apparatus comprising a pair of end metallic disks, a metal shell connecting said disks, tubular members of insulating material mounted in said disks, coils carried by said tubular members, a third tubular member, interposed between the first mentioned tubular members, a coil mounted on said third tubular member for inducing electromotive forces in the first mentioned coils, a disk of insulating material mounted in said shell and supporting said third tubular member, the last mentioned disk having an arm extending through an opening in said shell, means engaging said arm for shifting said disk and said third tubular member to adjust the coil carried thereby along the axis of the first mentioned coils, an insulating tube mounted within the first mentioned tubular members and providing a passage for the travel of objects through said coils, wires carried by the last mentioned tube and connected electrically with said end disks for shielding said coils electrostatically from said objects, disks of insulating material positioned between the aforesaid third tubular member and the first mentioned tubular members, and radially extending wires mounted on the last mentioned disks for shielding the first mentioned coils electrostatically from the third coil.

5. In combination with a cigar machine including means for conveying cigar units along a given path, means responsive to the presence of metal in a cigar unit, means for shielding said metal-responsive means from the electrostatic disturbance by said cigar units, means for shielding said metal-responsive means against disturbances from said cigar machine, and means controlled by said metal-responsive means for designating a unit in which metal is present.

6. In combination with a cigar machine including means for conveying cigar units along a given path, means responsive to the presence of metal in a cigar unit, means for shielding said metal-responsive means from the electrostatic disturbances by said cigar units, means for shielding said metal-responsive means against disturbances from said cigar machine, and means controlled by said metal-responsive means for causing a unit in which metal is present to be ejected from the machine.

7. The method of detecting the presence of particles of metal embedded in nonmetallic material many times greater in bulk than said particles which comprises setting up relative motion between said material and an impedance bridge to cause metal present in said material to develop a voltage between certain points on said bridge, shielding said bridge against electrostatic disturbances from said nonmetallic material, and applying said voltage to the production of an effect indicative of the portion of said material in which said metal is present.

8. Apparatus for the detection of metallic matter in nonmetallic objects, said apparatus comprising a coil having an air core, means for energizing said coil, means for conveying a series of objects successively through a region influenced by said coil, and means between said coil and the path of travel of said objects for shielding said coil against electrostatic interference from said objects.

9. Apparatus for the detection of metallic matter in nonmetallic objects, said apparatus comprising a pair of axially spaced coils, a third coil connected to a source of electrical energy and arranged intermediate the first-mentioned coils for energizing the latter, all of said coils having air cores, means for conveying a series of objects successively through said coils, and means between said coils and the path of travel of said objects for shielding said coils against electrostatic disturbances from the passage of said objects through said coils.

10. The method of detecting the presence of particles of metallic matter embedded in nonmetallic objects many times greater in size than said particles, said method comprising applying a high frequency voltage to a balanced impedance bridge, passing said objects successively through an electro-magnetic field produced by said bridge to thereby cause metallic matter in any of said objects to disturb the balance of said bridge, and to develop a voltage between given points, shielding said bridge against electrostatic disturbances by said objects during the travel of the latter through said field and applying said voltage to the production of an effect indicative of the object in which metallic matter is present.

11. Apparatus for the detection of metallic material in nonmetallic objects, said apparatus comprising a source of alternating current, an impedance bridge containing a coil having an air core and energized by said source, means for passing a series of said objects along a given path through an electro-magnetic region produced by said coil to thereby cause metallic material in any of said objects to change the inductance of said coil and to disturb the balance of said bridge to thereby develop a voltage between certain portions of said bridge, means between the path of travel of said objects and said coil for shielding said coil against electrostatic disturbances from said objects, and means responsive to said voltage for designating any object containing metallic material.

12. Apparatus for detecting metallic matter in nonmetallic material, said apparatus comprising a coil having an air core, means for energizing said coil, means for passing nonmetallic material into a magnetic field linked with said coil, means responsive to the effect of metallic matter upon said field for designating the portion of said material containing said matter, and means between the path of travel of said material and said coil for shielding said coil against electrostatic interference from said material.

WILLIAM C. BROEKHUYSEN.